United States Patent
Verdun et al.

(10) Patent No.: US 6,691,237 B1
(45) Date of Patent: Feb. 10, 2004

(54) ACTIVE MEMORY POOL MANAGEMENT POLICIES

(75) Inventors: Gary J. Verdun, Belton, TX (US); Chad P. Roesle, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 567 days.

(21) Appl. No.: 09/634,816

(22) Filed: Aug. 8, 2000

(51) Int. Cl.⁷ .................................................. G06F 1/32
(52) U.S. Cl. ...................................... 713/320; 711/170
(58) Field of Search ................................ 713/300–340; 711/100, 147–166, 170–173

(56) References Cited

U.S. PATENT DOCUMENTS

| | | | |
|---|---|---|---|
| 5,404,546 A | 4/1995 | Stewart | |
| 5,410,711 A | 4/1995 | Stewart | |
| 5,504,907 A | 4/1996 | Sato et al. | |
| 5,519,261 A | 5/1996 | Stewart | |
| 5,524,248 A | 6/1996 | Parks et al. | |
| 5,603,040 A | 2/1997 | Bell et al. | |
| 5,675,790 A | * 10/1997 | Walls ......................... | 707/205 |
| 5,675,814 A | 10/1997 | Pearce | |
| 5,771,390 A | 6/1998 | Pearce et al. | |
| 5,928,365 A | * 7/1999 | Yoshida ...................... | 713/324 |
| 5,984,116 A | 11/1999 | Busch et al. | |
| 5,996,078 A | 11/1999 | Christensen et al. | |
| 6,038,673 A | * 3/2000 | Benn et al. ................. | 713/323 |
| 6,219,772 B1 | * 4/2001 | Gadangi et al. ............ | 711/170 |
| 6,330,639 B1 | * 12/2001 | Fanning et al. ............ | 711/106 |
| 6,442,698 B2 | * 8/2002 | Nizar ........................ | 713/320 |

OTHER PUBLICATIONS

Verdun, Gary, "RAMBUS Memory Power Management Through Active Pool Management Policies Tailored to Portable Computer User Scenarios," filed Jan. 24, 2000; U.S. patent application Ser No. 09/490,795. (Copy not enclosed.).
"A Revolutionary Architecture for Mainstream Performance PCs in 2000," Intel 820 Chipset, Whitepaper, pp. 1–10, 1999.
Rambus, Inc., Preliminary Information, Direct RDRAM, 128/144–Mbit (256x16/18x32s), Document DV0059, Version 1.11, pp. 1–66, Jun. 2000.
Intel 820 Chipset Family: 82820 Memory Controller Hub (MCH) Datasheet, Order Number 290630–002, pp. 1–152., Jul. 2000.

* cited by examiner

Primary Examiner—Thomas M. Heckler
(74) Attorney, Agent, or Firm—Baker Botts L.L.P.

(57) ABSTRACT

A method and related computer system that allow monitoring at least one memory-accessing device, and adjusting pooling of data processing system memory devices in response to the monitoring.

18 Claims, 7 Drawing Sheets

ACTIVE MEMORY POOL MANAGEMENT POLICIES

BACKGROUND OF THE INVENTION

1. Field of the Invention

The devices and processes described herein relate, in general, to management of memory devices in data processing systems.

2. Description of the Related Art

Data processing systems are systems that manipulate, process, and store data. Personal computer systems, and their associated subsystems, constitute well-known examples of data processing systems.

Personal computer systems typically utilize memory devices. One type of memory device so utilized is known in the art as RAMBUS Dynamic Random Access Memory, or RDRAM. RDRAM is a proprietary type of computer memory developed by Rambus, Inc. of Mountain View, Calif., and has been adopted for use by Intel Corporation of Santa Clara, Calif.

Operation of RDRAM memory devices consumes considerable amounts of power and produces considerable amounts of heat. In many data processing systems, (e.g., portable computer systems such as notebook and subnotebook computer systems) power and heat management constitute significant design concerns. These power and heat management design concerns have been recognized by RDRAM designers and developers, and thus the RDRAM specification provides defined power management policies.

The inventors named herein have discovered, and such discovery forms part of the inventive content herein, that RDRAM pooling policies can be tailored to monitored memory use in order to provide near-optimum power management and performance. It has also been discovered that the foregoing discovery can be extended to benefit other memory devices which utilize pooling schemes.

SUMMARY OF THE INVENTION

The inventors named herein have invented a method and related system which tailor memory device (e.g., RDRAM) pooling policies to monitored memory use in order to provide near-optimum power management and performance.

In one embodiment, a method includes but is not limited to monitoring at least one memory-accessing device, and adjusting pooling of data processing system memory devices in response to the monitoring. In one embodiment, circuitry is used to effect the foregoing-described method; the circuitry can be virtually any combination of hardware, software, and/or firmware configured to effect the foregoing-described method depending upon the design choices of the system designer.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the non-limiting detailed description set forth below.

BRIEF DESCRIPTION OF THE DRAWINGS

The devices and/or processes described herein may be better understood, and their numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description for carrying out the devices and/or processes described-herein. The description is intended to be illustrative and should not be taken to be limiting.

It has been discovered by the inventors, and such discovery forms part of the inventive content herein, that the substantially continuously varying memory requirements of near real-time computer operations can be viewed as a relatively unvarying aggregate requirement over varying periods of time. For example, over an example period of 20 milliseconds, memory requirements might surge to 128 Mbytes during a 3 millisecond interval, yet remain at 32 Mbytes during the remaining 17 millisecond interval. The inventors named herein have devised a process and device that manage RAMBUS memory pools based upon monitored memory requirements over intervals.

The *Rambus Direct RDRAM* 128/144-Mbit (256K×16/18×32s) *Specification*, available from the RAMBUS Corporation of Mountain View, Calif., USA, hereby incorporated by reference in its entirety, defines RDRAM power draw specifications as follows:

TABLE 1

| RDRAM Memory Status | $I_{DD}$ | Response Time |
| --- | --- | --- |
| Active | 100% (≅148 mAmps) | ≅substantially immediate -- 1–4 bus clock cycles |
| Standby | 68% (≅101 mAmps) | ≅intermediate response time -- ≅10–20 bus clock cycles) |
| Nap State | 3% (≅4.2 mA) | ≅very long response time -- ≅100 ns) |

Intel Corporation has included RDRAM in its chipsets, and has extended the power management capabilities associated with RDRAM. Specifically, Intel has allowed designers the ability to specify "pools" of RDRAM devices. An example of such pool specifications, drawn from the *Intel 820 Chipset: 82820 Memory Controller Hub (MCH)*

Specification, available from the Intel Corporation of Santa Clara, Calif., USA hereby incorporated by reference in its entirety, is as follows:

TABLE 2

| Pool A -- Up to 8 RDRAM Devices, only 4 of which can be active at any one time | Pool B -- By definition those RDRAM devices not in Pool A |
| --- | --- |
| Device Status | Either Active or Standby | Nap Mode |

Intel Corporation lets the designer specify how many devices are in Pool A or Pool B at any one time. The inventors named herein have discovered that systems can dynamically manage the number of devices in the pools in response to monitored memory use such that near-optimum power management with respect to such memory devices is achieved without sacrificing any substantial amount of system performance.

Figure 1:
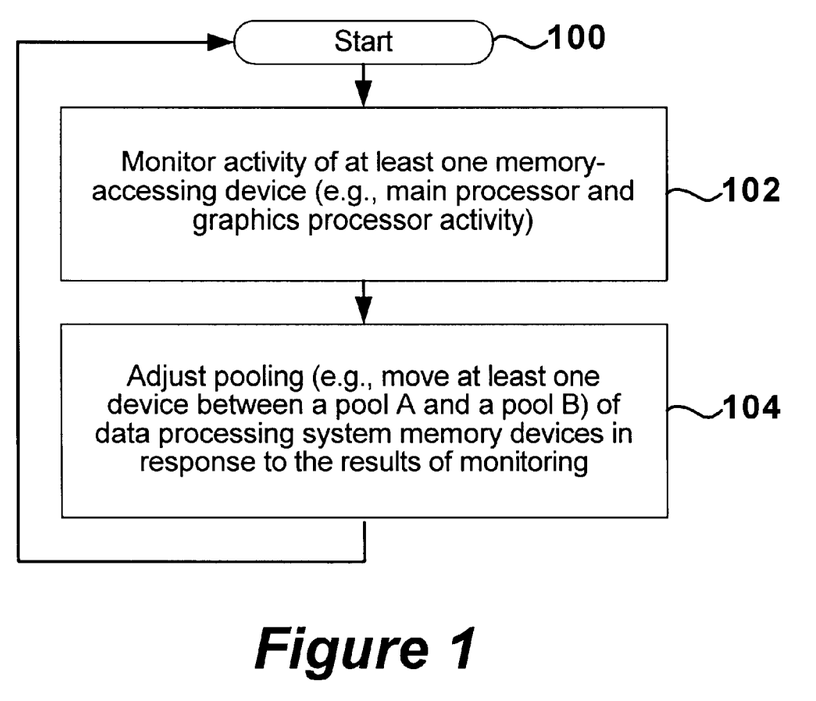
FIG. 1 is shows a process illustrating adjustment of pooling policies (e.g., the number and/or state of devices in memory Pool A and Pool B (see table 2)) in response to monitored memory device usage.

With reference now to FIG. 1, shown is a process illustrating adjustment of pooling policies (e.g., the number and/or state of devices in memory Pool A and Pool B (see table 2)) in response to monitored memory device usage. Method step 100 shows the start of the process. Method step 102 depicts monitoring the activity of at least one memory-accessing device (e.g., monitoring a main data processor and a main graphics processor) from which it will be inferred that the memory-accessing device is or will utilize memory; in one embodiment main data processor activity is monitored by tracking the value of a CPU_STOP_CLOCK signal of a main data processor and graphics processor activity is monitored by tracking a value of an AGP_BUSY signal of an AGP subsystem. Thereafter, method step 104 shows adjusting pooling of data processing system memory devices in response to the monitoring step; in one embodiment, the step of adjusting involves moving at least one memory device (e.g., RDRAM) between Pools A and B and designating devices in Pool A to be in either active or standby states, while in another embodiment the step of adjusting involves moving at least one memory device in Pools A between active and standby states. Subsequently, shown is that the process proceeds to method step 100 and continues.

Figure 2:
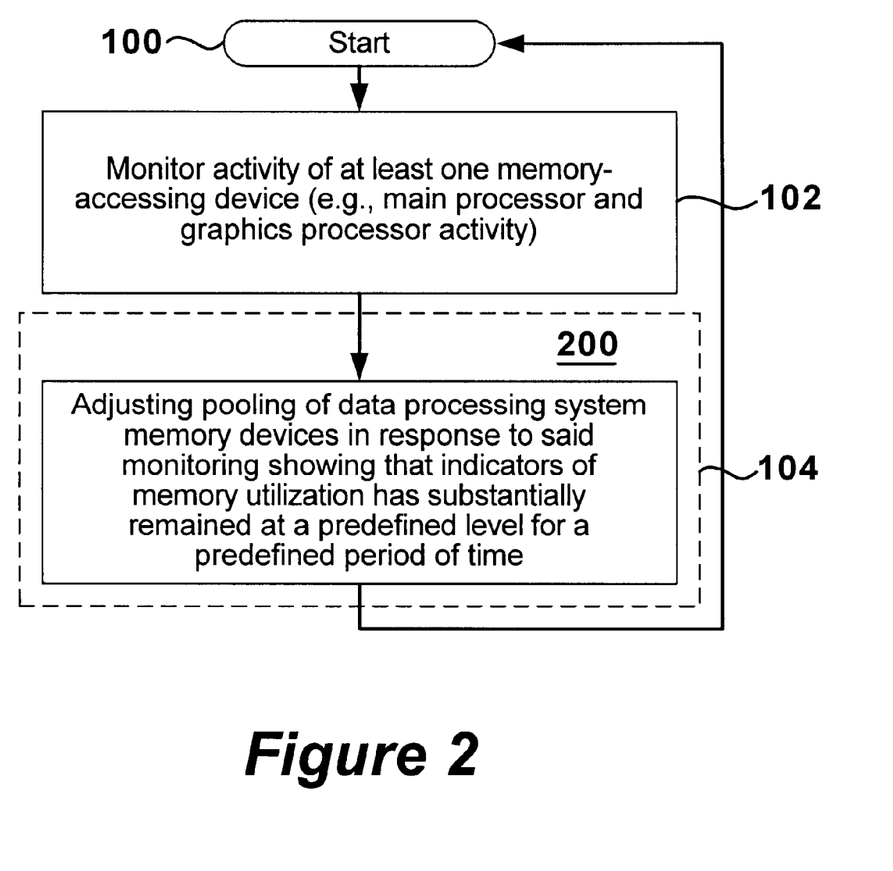
FIG. 2 depicts the process of FIG. 1 wherein a more-detailed embodiment of method step 104 is illustrated.

With reference now to FIG. 2, shown is the process of FIG. 1 wherein a more-detailed embodiment of method step 104 is depicted. Method step 200 illustrates that in one embodiment, method step 104 includes but is not limited to adjusting the pooling of data processing system memory devices in response to the monitoring step showing that memory utilization has substantially remained at a pre-defined level for an interval of time. For example, in one embodiment, if it is inferred that during a predefined interval of time (the length of which can vary and which is a design choice within the purview of the system designer) either or both the main data processor and main graphics processor both have manifested relatively high and/or relatively constant memory device requirements, the pooling is adjusted such that as many memory devices as practicable are placed into Pool A and designated as active (how many devices constitute "as many as practicable" is a design choice within the purview of the system designer, but in one embodiment the number deemed as many as practicable equates to 8 RDRAM devices in Pool A, 4 of which are designated as "active"). In another embodiment, if it is inferred that during an interval of time (the length of which can vary and which is a design choice within the purview of the system designer) either or both the main data processor and main graphics processor both have manifested relatively moderate and/or relatively frequent memory device requirements, the pooling is adjusted such that a moderate number of memory devices are placed into Pool A and designated as active(what constitutes a moderate number is a design choice within the purview of the system designer, but in one embodiment the number deemed moderate ranges between 2 and 4 RDRAM devices in Pool A, where half the number of devices in Pool A are designated active and half the number of device in Pool A are designated standby). In another embodiment, if it is inferred that during an interval of time (the length of which is a design choice within the purview of the system designer) the main data processor and main graphics processor have manifested relatively minimum and/or relatively infrequent memory device requirements, the pooling is adjusted such that a minimum number of memory devices are placed into Pool A and designated as active(what constitutes a minimum number is a design choice within the purview of the system designer, but in one embodiment the number deemed minimum is one RDRAM device in Pool A, which is designated active).

Figure 3A:
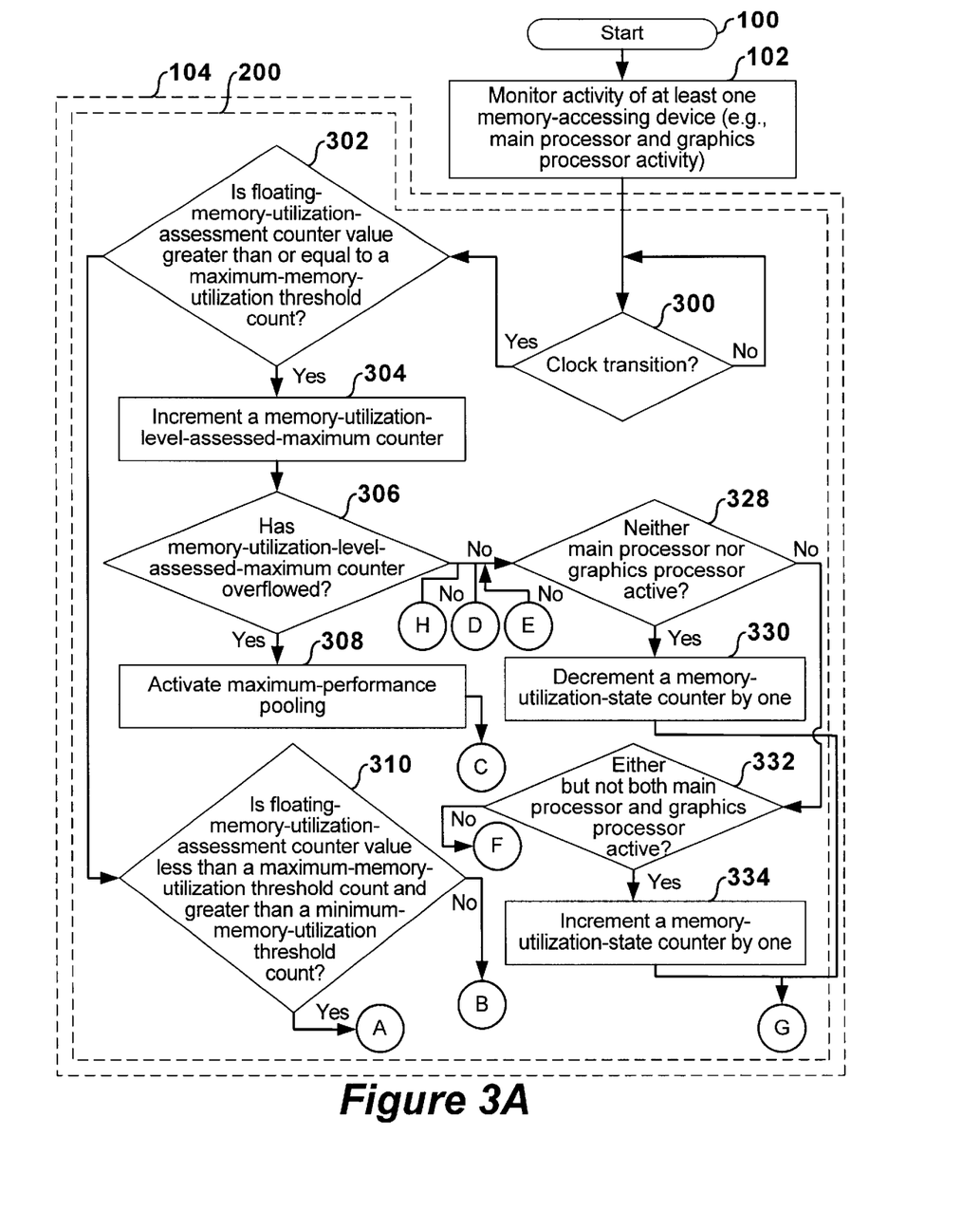
FIG. 3 illustrates the process of FIG. 2 wherein a more-detailed embodiment of method step 200 is depicted.
Figure 3B:
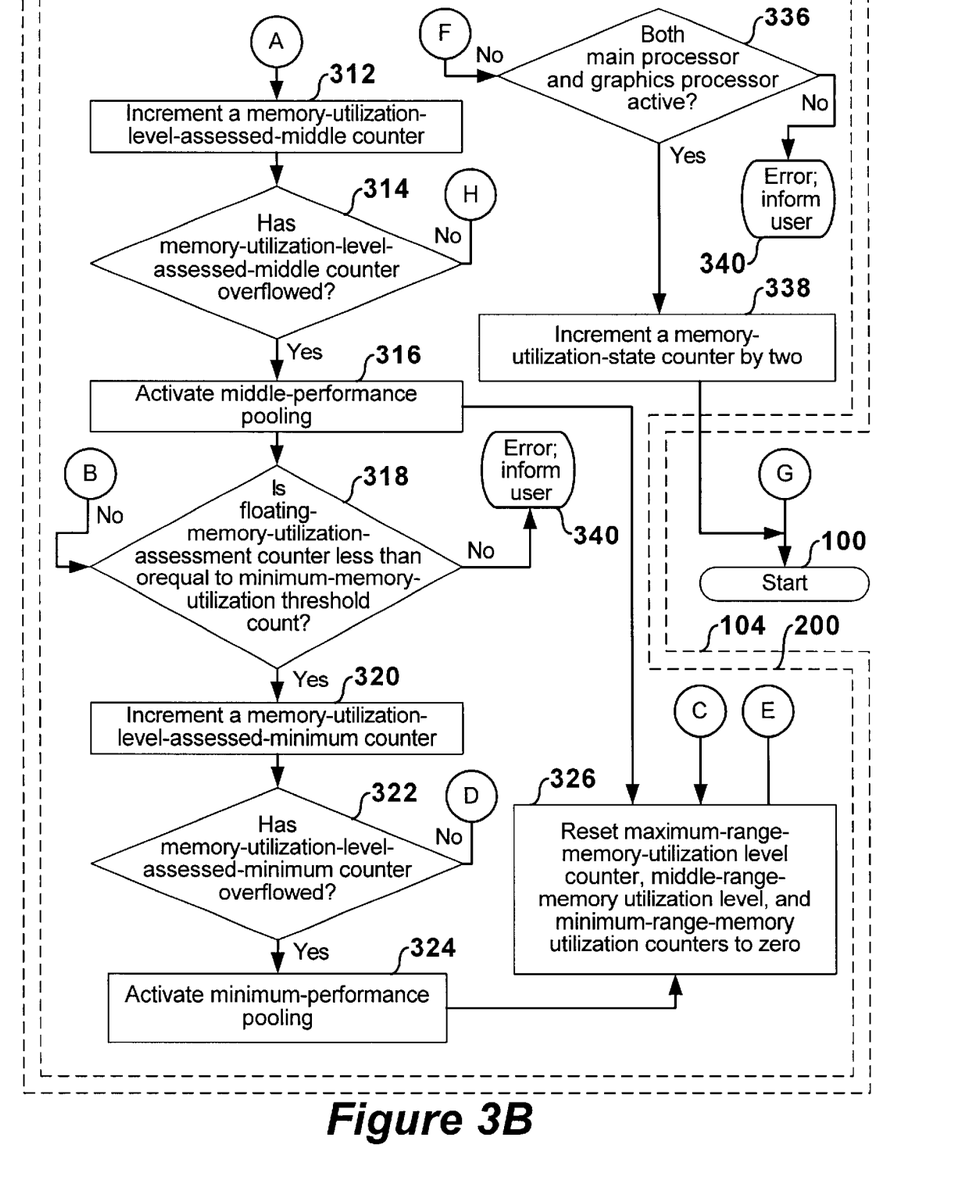

Referring now to FIG. 3, illustrated is the process of FIG. 2 wherein a more detailed embodiment of method step 200 is depicted. Method step 300 illustrates an inquiry as to whether a clock (e.g., a system clock or bus clock) has transitioned. In the event that the inquiry of method step 300 is answered in the negative, shown is that the process proceeds to method step 300 (i.e., "loops"); however, if the inquiry of method step 300 is answered in the affirmative, depicted is that the process proceeds to method step 302.

Method step 302 shows an inquiry as to whether a floating-memory-utilization-assessment counter contains a value greater than or equal to a maximum-memory-utilization threshold count; as demonstrated below, in one embodiment, the memory utilization state counter is a "floating" count-up counter which is (a) incremented by a relatively smaller amount (e.g., by the number 1) at each detected system clock transition when system memory device loading is detected moderate, (b) incremented at a relatively larger amount (e.g., by the number 2) when system memory device loading is detected heavy, and (c) decremented by a relatively smaller amount (e.g., by the number 1) when the system memory device loading is detected as essentially nil. In the event that the inquiry of method step 302 is answered in the negative, shown is that the process proceeds to method step 310; however, if the inquiry of method step 302 is answered in the affirmative, depicted is that the process proceeds to method step 304.

Method step 304 illustrates incrementing a memory-utilization-level-assessed-to-be-maximum counter by one. Thereafter, method step 306 depicts an inquiry as to whether the memory-utilization-level-assessed-to-be-maximum counter has overflowed. In the event that the inquiry of method step 306 is answered in the negative, shown is that the process proceeds to method step 328; however, if the inquiry of method step 306 is answered in the affirmative, depicted is that the process proceeds to method step 308.

Method step 308 illustrates activating maximum-performance pooling; in one embodiment, such maximum-performance pooling constitutes placing as many devices as practicable in the system in Pool A and designating such devices as active. Thereafter, the shown is that the process proceeds to method step 326.

Returning now to method step 302, shown is that in the event that the inquiry of method step 302 is answered in the negative, depicted is that the process proceeds to method step 310. Method step 310 depicts an inquiry as to the floating-memory-utilization-assessment counter value is less than a maximum-memory-utilization threshold count and greater than a minimum-memory-utilization threshold count. In the event that the inquiry of method step 310 is answered in the negative, shown is that the process proceeds to method step 318; however, if the inquiry of method step 310 is answered in the affirmative, depicted is that the process proceeds to method step 312.

Method step 312 illustrates incrementing a memory-utilization-level-assessed-to-be-middle counter by one. Thereafter, method step 314 depicts an inquiry as to whether the memory-utilization-level-assessed-to-be-middle counter has overflowed. In the event that the inquiry of method step 314 is answered in the negative, shown is that the process proceeds to method step 328; however, if the inquiry of method step 314 is answered in the affirmative, depicted is that the process proceeds to method step 316.

Method step 316 illustrates activating middle-performance pooling; in one embodiment, such middle-performance pooling constitutes placing a moderate number of devices in Pool A and designating at least one of such devices as active (how in one embodiment, middle-performance pooling constitutes 4 devices in Pool A, of which two are designated active and two are designated standby). Thereafter, shown is that the process proceeds to method step 326.

Returning now to method step 310, shown is that in the event that the inquiry of method step 310 is answered in the negative, depicted is that the process proceeds to method step 318. Method step 318 depicts a determination of whether that the floating-memory-utilization-assessment counter value is less than or equal to a minimum-memory-utilization threshold count; in the event that the inquiry is answered in the negative, shown is that the process proceeds to method step 340 which illustrates that an error state exists and that the user (or system) is informed of the error (due to the structure of the process, the process will not arrive at method step 340 unless an error has occurred in normal operation the system should never arrive at method step 340). In the event that the inquiry of method step 318 is answered in the affirmative, shown is that the process proceeds to method step 320 which illustrates incrementing a memory-utilization-level-assessed-to-be-minimum counter by one. Thereafter, method step 322 depicts an inquiry as to whether the memory-utilization-level-assessed-to-be-minimum counter has overflowed. In the event that the inquiry of method step 322 is answered in the negative, shown is that the process proceeds to method step 328; however, if the inquiry of method step 322 is answered in the affirmative, depicted is that the process proceeds to method step 324.

Method step 324 illustrates activating minimum-performance pooling; in one embodiment, such minimum-performance pooling constitutes placing a defined minimum number of devices in Pool A and designating at least one of such devices as active (in one embodiment, minimum-performance pooling constitutes placing 1 device in Pool A, such device designated as active). Thereafter, shown is that the process proceeds to method step 326.

Method step 326 depicts the operation of resetting the memory-utilization-level-assessed-to-be-maximum, the memory-utilization-level-assessed-to-be-middle, and the minimum-range-memory utilization counters to zero. That is, once one of such counters is detected as having entered an overflow condition, the counters are reset. Thereafter, the process proceeds to method step 328.

Method step 328 depicts an inquiry as to whether neither a main data processor nor a main graphics processor are detected active (from such activity it is inferred that memory device requirements are essentially nil); in one embodiment, such information is respectively gleaned from detected values of CPU_STOP_CLOCK and AGP_BUSY signals. In the event that the inquiry of method step 328 is answered in the negative, shown is that the process proceeds to method step 332; however, if the inquiry of method step 328 is answered in the affirmative, depicted is that the process proceeds to method step 330.

Method step 330 illustrates that the value of the floating-memory-utilization-assessment counter is decremented by one; however, one is merely exemplary, and the decrementing could involve decrements greater than one. Thereafter, shown is that the process proceeds to method step 100 and continues from that point.

Returning now to method step 328, shown is that in the event that the inquiry of method step 328 is answered in the negative, the process proceeds to method step 332. Method step 332 depicts an inquiry as to whether either but not both a main data processor and a main graphics processor are detected active (from such activity it is inferred that memory device requirements are essentially moderate); in one embodiment, such information is respectively gleaned from detected values of CPU_STOP_CLOCK and AGP_BUSY signals. In the event that the inquiry of method step 332 is answered in the negative, shown is that the process proceeds to method step 336; however, if the inquiry of method step 332 is answered in the affirmative, depicted is that the process proceeds to method step 334.

Method step 334 illustrates that the value of the floating-memory-utilization-assessment counter is incremented by one; however, one is merely exemplary, and the incrementing could involve increments greater than one. Thereafter, shown is that the process proceeds to method step 100 and continues from that point.

Returning now to method step 332, shown is that in the event that the inquiry of method step 332 is answered in the negative, the process proceeds to method step 336. Method step 336 depicts an inquiry as to whether both a main data processor and a main graphics processor are detected active (from such activity it is inferred that memory device requirements are essentially high); in one embodiment, such information is respectively gleaned from detected values of CPU_STOP_CLOCK and AGP_BUSY signals. In the event that the inquiry of method step 336 is answered in the negative, shown is that the process proceeds to method step 340 and stops in an error condition and alerts the user as to the error (that is, the process should never reach method step 340, but if it does, it is indicative that an error has occurred); however, if the inquiry of method step 336 is answered in the affirmative, depicted is that the process proceeds to method step 338.

Method step 338 illustrates that the value of the floating-memory-utilization-assessment counter is incremented by two; however, two is merely exemplary, and the incrementing could involve increments greater than two. Thereafter, shown is that the process proceeds to method step 100 and continues from that point.

Figure 4:
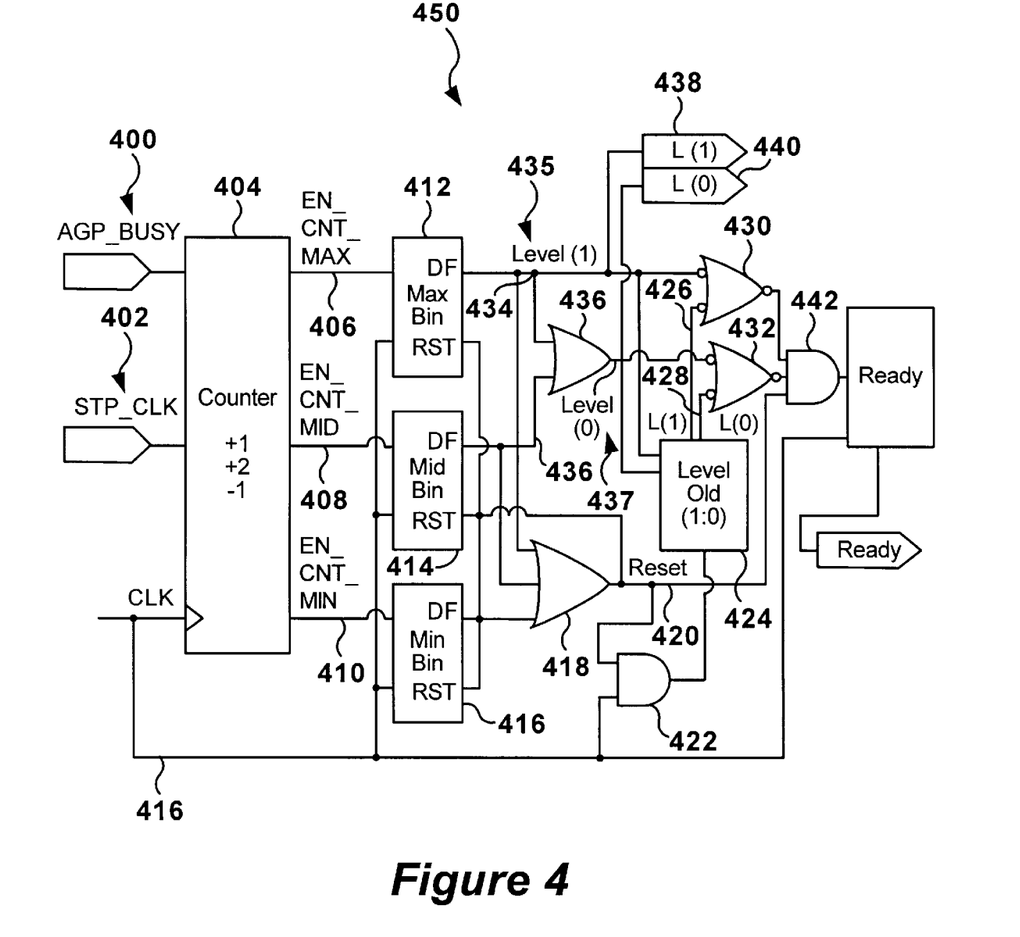
FIG. 4 shows a schematic diagram of a circuit, which serves as an embodiment of a portion of the process illustrated in FIG. 3.

With reference now to FIG. 4, shown is a schematic diagram of a circuit 450 which serves as an embodiment of a portion of the process illustrated in FIG. 3. Shown are AGP_BUSY and CPU_STOP_CLOCK signals 400, 402 which feed into floating-memory-utilization-assessment counter 404. Depicted are three output lines: memory-utilization-state-counter-value-in-maximum-memory-utilization zone line 406 (in one embodiment, this line is active when the value of the floating-memory-utilization-assessment counter is greater than or equal to a maximum-memory-utilization-zone threshold count, which in one embodiment is a value of about 5460); memory-utilization-state-counter-value-in-middle-memory-utilization-zone line 408 (in one embodiment, this line is active when the value of the floating-memory-utilization-assessment counter 404 is less than a maximum-memory-utilization-zone threshold count, which in one embodiment has a value of about 5460, and greater than a minimum-memory-utilization threshold count, which in one embodiment has a value of about 2731); and memory-utilization-state-counter-value-in-minimum-memory-utilization-zone line 410 (in one embodiment, this line is active when the value of the minimum floating-memory-utilization-assessment counter is less than or equal to the minimum-memory-utilization-zone threshold count, which in one embodiment is a value of about 2731).

Illustrated is that memory-utilization-state-counter-value-in-maximum-memory-utilization-zone line 406, memory-utilization-state-counter-value-in-middle-memory-utilization-zone line 408, and memory-utilization-state-counter-value-in-minimum-memory-utilization-zone line 410 respectively connect with memory-utilization-level-assessed-to-be-maximum counter 412, memory-utilization-level-assessed-to-be-middle counter 414, and memory-utilization-level-assessed-to-be-minimum counter 416. When clock signal 416 transitions, whichever of memory-utilization-level-assessed-to-be-maximum counter 412, memory-utilization-level-assessed-to-be-middle counter 414, and memory-utilization-level-assessed-to-be-minimum counter 416 has active input lines increments by one.

Shown is that all outputs of memory-utilization-level-assessed-to-be-maximum counter 412, memory-utilization-level-assessed-to-be-middle counter 414, and memory-utilization-level-assessed-to-be-minimum counter 416 feed into OR gate 418. Output 420 of OR gate 418 is operably connected to the resets pins of memory-utilization-level-assessed-to-be-maximum counter 412, memory-utilization-level-assessed-to-be-middle counter 414, and memory-utilization-level-assessed-to-be-minimum counter 416. Additionally, output 420 is operably connected with AND gate 422.

When clock signal 416 transitions, AND gate 422 activates Level Old (1:0) circuit 424. Level Old (1:0) circuit 424 has Level_Old_Output 1 (LO(1)) 426 and Level_Old_Output 0 (LO(0)) 428 which respectively operatively connect with exclusive NOR gates 430, 432. Also shown operably connected with exclusive NOR gates 430, 432 are the outputs of memory-utilization-level-assessed-to-be-maximum counter 412, memory-utilization-level-assessed-to-be-middle counter 414; notice that if both output 434 of memory-utilization-level-assessed-to-be-middle counter 412 and output 436 of memory-utilization-level-assessed-to-be-maximum counter 414 are zero, then the Level(1) signal 435 will be zero and the Level(0) signal 437 will be zero, whereas if output 434 of memory-utilization-level-assessed-to-be-middle counter 412 is zero, and output 436 of memory-utilization-level-assessed-to-be-maximum counter 414 is one, then the Level(1) signal 435 will be zero and the Level(0) signal 437 will be zero, whereas if output 434 of memory-utilization-level-assessed-to-be-middle counter 412 is 1, and output 436 of memory-utilization-level-assessed-to-be-maximum counter 414 is zero, then the Level (1) signal 435 will be zero and the Level(0) signal 437 will be one. Consequently, the circuit 450 shown indicates that maximum-performance pooling is necessary with a signal 11, middle-performance pooling is necessary with a signal 01, and minimum-performance pooling is necessary with a signal 00 appearing on L(1) and L(0) connectors 438, 440.

Depicted is that the outputs of exclusive NOR gates 430, 432 feed AND gate 442, along with output 420. It is desired to keep the system as stable as possible. Consequently, the inputs of exclusive NOR gates 430, 432 are such that the outputs of exclusive NOR gates 430, 432 will only transition if the signals appearing on appearing on Level(1) signal 435 and the Level(0) signal 437 transition to new signals from those present during the previous clock transition. Thus, the output of AND gate 442 becomes high when the signals appearing on appearing on Level(1) signal 435, the Level(0) signal 437, and output 420 indicate that the system is to change to a new pooling state.

Those skilled in the art will recognize that the state of the art has progressed to the point where there is little distinction left between hardware and software implementations of aspects of systems; the use of hardware or software is generally a design choice representing cost vs. efficiency tradeoffs. The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the devices and/or processes described herein may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the devices and/or processes described herein are capable of being distributed as a program product in a variety of forms, and that an illustrative embodiment of the devices and/or processes described herein applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes but is not limited to electrical circuitry having at least one discrete electrical circuit, electrical circuitry having at least one integrated circuit, electrical circuitry having at least one application specific integrated circuit, electrical circuitry forming a general purpose computing device configurable by a computer program (e.g., a general purpose computer configurable by a computer program or a microprocessor configurable by a computer program), electrical circuitry forming a memory device (e.g., any and all forms of random access memory), and electrical circuitry forming a communications device (e.g., a modem, communications switch, or optical-electrical equipment).

Figure 5:
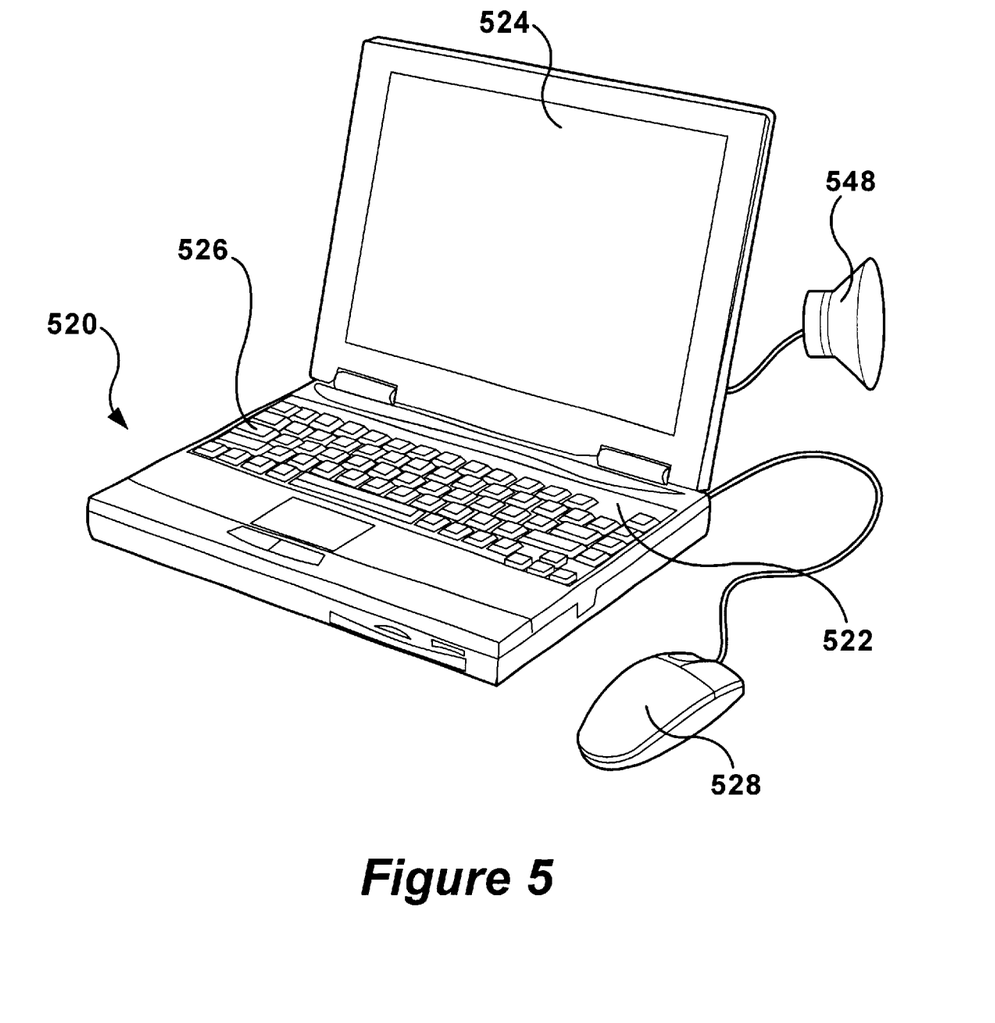
FIG. 5 depicts a pictorial representation of a conventional data processing system which can be utilized in accordance with illustrative embodiments of the graphical user interfaces and processes described herein.
Figure 6:
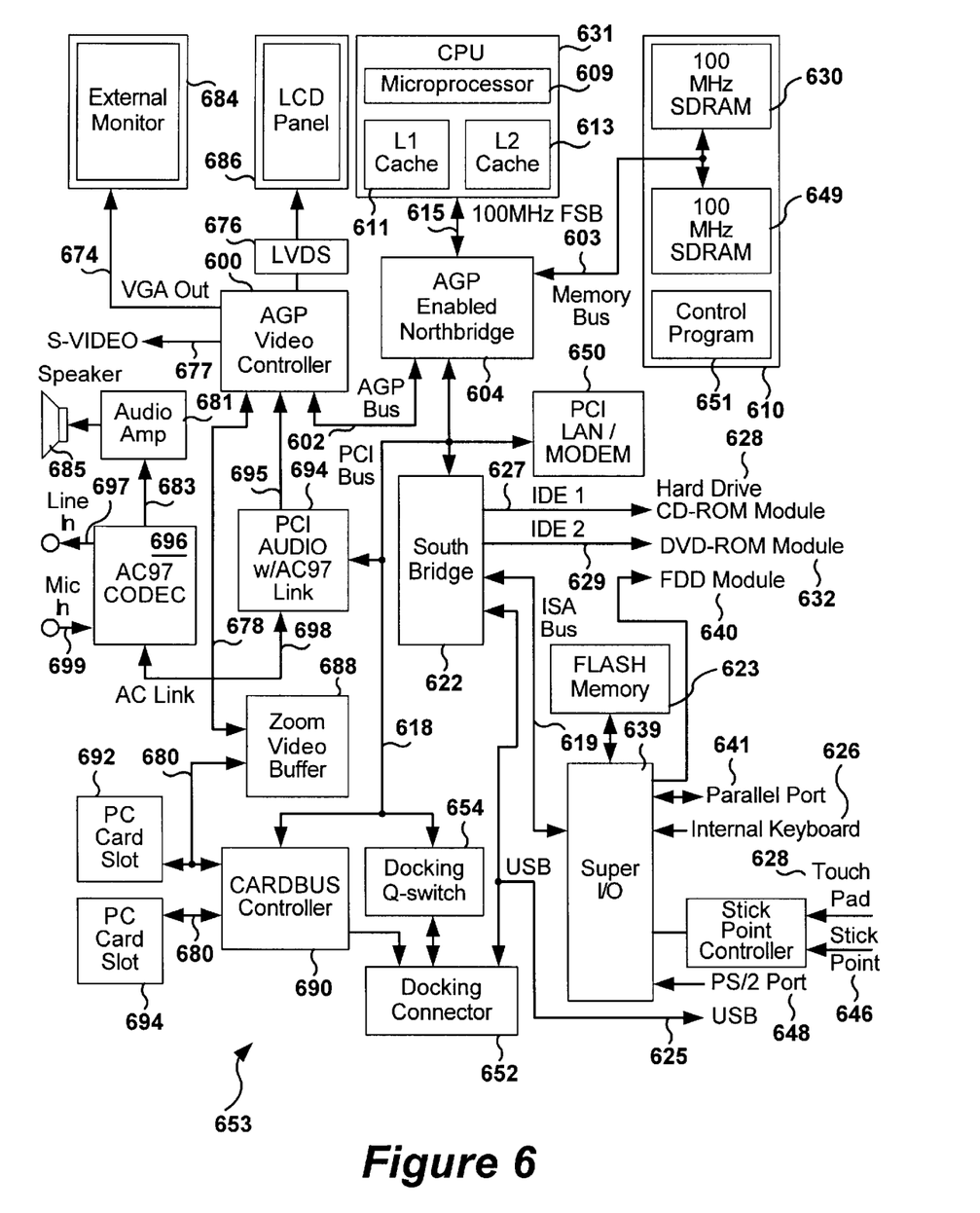
FIG. 6 depicts selected components of data processing system 520 in which illustrative embodiments of the graphical user interfaces and processes described above can be implemented.

Those skilled in the art will recognize that it is common within the art to describe devices and/or processes in the fashion set forth above, and thereafter use standard engineering practices to integrate such described devices and/or processes into data processing systems. That is, the devices and/or processes described above can be integrated into data processing system via a reasonable amount of experimentation. FIGS. 5 and 6 show an example representation of a data processing system into which the described devices and/or processes may be implemented with a reasonable amount of experimentation.

With reference now to FIG. 5, depicted a pictorial representation of a conventional data processing system in which illustrative embodiments of the devices and/or processes described herein may be implemented. It should be noted that a graphical user interface systems (e.g., Microsoft Windows 98 or Microsoft Windows NT operating systems) and methods can be utilized with the data processing system depicted in FIG. 6. Data processing system 520 is depicted which includes system unit housing 522, video display device 524, keyboard 526, mouse 528, and microphone 548. Data processing system 520 may be implemented utilizing any suitable computer such as those sold by Dell Computer Corporation, located in Round Rock, Tex. Dell is a trademark of Dell Computer Corporation.

Referring now to FIG. 6, depicted is data processing system motherboard 653 having selected components of data processing system 520 in which illustrative embodiments of the devices and/or processes described herein may be implemented. Data processing system 520 includes Central Processing Unit ("CPU") 631 (wherein are depicted microprocessor 609, L1 Cache 611, and L2 Cache 613). CPU 631 is coupled to CPU bus 615.

CPU bus 615 is coupled to AGP-enabled Northbridge 604, which serves as a "bridge" between CPU bus 615, AGP interconnect (or bus) 602 (a type of data bus), and system memory bus 603. In going from one type of bus to another type of bus, a "bridge" is generally needed because the two different type buses speak a different "language." The term "AGP-enabled" is intended to mean that the so-referenced components are engineered such that they interface and function under the standards defined within the AGP interface specification (Intel Corporation, Accelerated Graphics Port Interface Specification).

Generally, each bus in a system utilizes an independent set of protocols (or rules) to conduct data, which are generally set forth in a product specification uniquely tailored to the type of bus in question (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses a reconnected. This is one of the functions of AGP-enabled Northbridge 604, as well as the Southbridge 622, in that it is to be understood that such bridge scan translate and coordinate between various data buses and/or devices which communicate through the bridges.

AGP interconnect 602 interfaces with AGP-enabled video controller 600, which respectively interconnects with video display devices external monitor 684 and LCD (Liquid Crystal Display) panel 686 (each of which are specific illustrations of the more general video display device 524) through VGA (video Graphics Array) out) 674 and LVDS (Low Voltage Differential Signaling) bus 676. AGP-enabled video controller 600 also is depicted with S-Video out jack 677. AGP-enabled video controller 600 also is depicted as interconnected with zoom video buffer 688 via zoom video buffer bus 678. Zoom video buffer 688 is illustrated as interconnected with cardbus controller 690 via cardbus controller lines 680. Shown is that Cardbus controller lines 680 connect Cardbus controller 690 with PCI card slots 692 and 694.

Shown is that AGP-enabled video controller 600 interconnects with PCI audio w/AC97 link 694 via PCI audio-AGP video bus 695. Depicted is that PCI audio w/AC97 link 694 interconnects with AC97 CODEC 696 via AC97 link 698. Illustrated is that AC97 CODEC 696 has line in jack 697 and mic in jack 699. Depicted is that AC97 CODEC 696 interfaces with audio amp 681 via AC97 CODEC-audio amp bus 683. Illustrated is that audio amp 681 drives speaker 685.

AGP-enabled Northbridge 604 interfaces with system memory bus 603. System memory bus 603 interfaces with system memory 616, which can contain various types of memory devices such as SDRAM chips 630 and 649, but which also can contain DRAM, Rambus DRAM, and other type memory chips. In addition, shown for sake of illustration is that data processing system 520 includes control program 651 which resides within system memory 616 and which is executed and/or operated on by CPU 631. Control program 651 contains instructions that when executed on CPU 631 carries out application program (e.g., videoconferencing software) operations.

AGP-enabled Northbridge 604 interfaces with Peripheral Component Interconnect (PCI) bus 618, upon which are shown PCI Input-Output (I/O) devices PCI LAN/modem card 650, PCI Audio w/AC97 link 694, cardbus controller 690, and docking Q switch 654 which is depicted as electrically connected with docking connector 652. Docking connector 652 is also shown electrically connected with cardbus controller 690 and universal serial bus (USB) 625.

Depicted is that Peripheral Component Interconnect (PCI) bus 618 interfaces with Southbridge 622. Southbridge 622 serves as a bridge between PCI bus 618 and I/O (or ISA) bus 619, universal serial bus USB 625, and Integrated Drive Electronics (IDE) connectors 627 and 629, which respectively connect with hard drive CD-ROM module 628 and DVD-ROM module 632.

I/O bus 619 interfaces with super I/O controller 639. Further shown is that super I/O controller 639 connects devices flash memory 623, FDD (floppy disk drive) module 640, parallel port 641, internal keyboard 626, mouse or touchpad 628, stick point 646, and PS/2 port 648 to I/O bus 619.

Data processing system 520 typically contains logic defining at least one graphical user interface, and any suitable machine-readable media may retain the graphical user interface, such as SDRAM 630, ROM, a magnetic diskette, magnetic tape, or optical disk. Any suitable operating system such as one having an associated graphical user interface (e.g., Microsoft Windows or Microsoft NT) may direct CPU 631. Other technologies can also be utilized in conjunction with CPU 631, such as touch-screen technology or human voice control.

Those skilled in the art will appreciate that the hardware depicted in FIG. 6 may vary for specific applications. For example, other peripheral devices such as optical disk media, audio adapters, video cameras such as those used in videoconferencing, or programmable devices, such as PAL or EPROM programming devices well-known in the art of computer hardware, and the like may be utilized in addition to or in place of the hardware already depicted.

Those skilled in the art will recognize that data processing system 520 can be described in relation to data processing systems which perform essentially the same functions, irrespective of architectures.

The foregoing components and devices are used herein as examples for sake of conceptual clarity. Thus, CPU 631 is utilized as an exemplar of any general processing unit, including but not limited to multiprocessor units; CPU bus 615 is utilized as an exemplar of any processing bus, including but not limited to multiprocessor buses; PCI devices attached to PCI bus 618 are utilized as exemplars of any input-output devices attached to any I/O bus; AGP Interconnect 602 is utilized as an exemplar of any graphics bus; AGP-enabled video controller 600 is utilized as an exemplar of any video controller; Northbridge 604 and Southbridge 622 are utilized as exemplars of any type of bridge; and PCI LAN/modem card 650 is used is intended to serve as an exemplar of any type of synchronous or asynchronous input-output card. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Those skilled in the art will recognize that data processing system 520 can be described in relation to data processing systems which perform essentially the same functions, irrespective of architectures. For example, another example of such data processing systems, wherein embodiments of the processes and devices described above may be implemented, appears in an Intel Corporation whitepaper, entitled *Intel 820 Chipset: A Revolutionary Architecture for Mainstream Performance PCs in* 2000, which is hereby incorporated by reference in its entirety (see especially FIG. 2, page 6, of the whitepaper). This whitepaper is available from of Intel Corporation of Santa Clara, Calif.

Other embodiments are within the following claims.

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the devices and/or processes described herein have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method comprising:
    monitoring at least one memory-accessin device; and
    adjusting pooling of data processing system memory devices in response to said monitoring;
    wherein said adjusting pooling of data processing system memory devices in response to said monitoring further comprises:
        adjusting pooling of data processing system memory devices in response to said monitoring showing that memory utilization has substantially remained at a predefined level for a predefined period of time.

2. The method of claim 1, wherein said adjusting pooling of data processing system memory devices in response to said monitoring showing that memory utilization has substantially remained at a predefined level for a predefined period of time further comprises:
    activating or maintaining maximum-performance pooling in response to a memory-utilization-level-assessed-to-be-maximum counter overflowing.

3. The method of claim 1, wherein said adjusting pooling of data processing system memory devices in response to said monitoring showing that memory utilization has substantially remained at a predefined level for a predefined period of time further comprises: activating or maintaining middle-performance pooling in response to a memory-utilization-level-assessed-to-be-middle counter overflowing.

4. The method of claim 1, wherein said adjusting pooling of data processing system memory devices in response to said monitoring showing that memory utilization has substantially remained at a predefined level for a predefined period of time further comprises:

activating or maintaining minimum-performance pooling in response to a memory-utilization-level-assessed-to-be-minimum counter overflowing.

5. The method of claim 1, wherein the showing that memory utilization has substantially remained at a predefined level for a predefined period of time further comprises:

maintaining at least one counter associated with at least one predefined memory utilization level, wherein the predefined memory utilization level is selected from the group including but not limited to a maximum-range memory utilization level, a medium-range memory utilization level, and a minimum-range memory utilization level.

6. The method of claim 5, wherein the maximum-range memory utilization level further comprises:

a floating-memory-utilization-assessment counter value greater than or equal to a maximum-memory-utilization threshold count.

7. The method of claim 5, wherein the medium-range memory utilization level further comprises:

a floating-memory-utilization-assessment counter value less than a maximum-memory-utilization threshold count and greater than a minimum-memory-utilization threshold count.

8. The method of claim 5, wherein the minimum-range memory utilization level further comprises:

a floating-memory-utilization-assessment counter value less than or equal to a minimum-memory-utilization threshold count.

9. The method of claim 5, wherein said maintaining at least one counter associated with at least one predefined memory utilization level further comprises:

incrementing a floating-memory-utilization-assessment counter by at least two when both a main data processor and a main graphics processor are in active states;

incrementing a floating-memory-utilization-assessment counter by at least one when either but not both the main data processor and the main graphics processor are in an active state; or decrementing a floating-memory-utilization-assessment counter by at least one when neither the main data processor nor the main graphics processor is in an active state.

10. A computer system comprising:

circuitry for monitoring at least one memory-accessing device said circuitry for monitoring comprising any combination of electrical circuitry selected from the group comprising electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device;

circuitry for adjusting pooling of data processing system memory devices in response to said circuitry for monitoring, said circuitry for adjusting pooling comprising any combination of electrical circuitry selected from the group comprising electrical circuitry having at least one discrete electrical circuit, electrical circuitry having at least one integrated circuit, electrical circuitry having at least one application specific integrated circuit, electrical circuitry forming a general purpose computing device configured by a computer program, electrical circuitry forming a memory device, and electrical circuitry forming a communications device; and said circuitry for monitoring and said circuitry for adjusting operably coupled to at least one data processing system component selected from the group comprising a processor device, a memory device, and a communication device;

wherein said circuitry for adjusting pooling of data processing system memory devices in response to said circuitry for monitoring further comprises:

circuitry for adjusting pooling of data processing system memory devices in response to said circuitry for monitoring showing that memory utilization has substantially remained at a predefined level for a predefined period of time.

11. The system of claim 10, wherein said circuitry for adjusting pooling of data processing system memory devices in response to said circuitry for monitoring showing that memory utilization has substantially remained at a predefined level for a predefined period of time further comprises:

circuitry for activating or maintaining maximum-performance pooling in response to a memory-utilization-level-assessed-to-be-maximum counter overflowing.

12. The system of claim 10, wherein said circuitry for adjusting pooling of data processing system memory devices in response to said circuitry for monitoring showing that memory utilization has substantially remained at a predefined level for a predefined period of time further comprises:

circuitry for activating or maintaining middle-performance pooling in response to a memory-utilization-level-assessed-to-be-middle counter overflowing.

13. The system of claim 10, wherein said circuitry for adjusting pooling of data processing system memory devices in response to said circuitry for monitoring showing that memory utilization has substantially remained at a predefined level for a predefined period of time further comprises:

circuitry for activating or maintaining minimum-performance pooling in response to a memory-utilization-level-assessed-to-be-minimum counter overflowing.

14. The system of claim 10, wherein the circuitry for showing that memory utilization has substantially remained at a predefined level for a predefined period of time further comprises:

circuitry for maintaining at least one counter associated with at least one predefined memory utilization level, wherein the predefined memory utilization level is selected from the group including but not limited to a maximum-range memory utilization level, a medium-range memory utilization level, and a minimum-range memory utilization level.

15. The system of claim 14, wherein the maximum-range memory utilization level further comprises:

a floating-memory-utilization-assessment counter value greater than or equal to a maximum-memory-utilization threshold count.

16. The system of claim 10, wherein the medium-range memory utilization level further comprises:

a floating-memory-utilization-assessment counter value less than a maximum-memory-utilization threshold count and greater than a minimum-memory-utilization threshold count.

17. The system of claim 14, wherein the minimum-range memory utilization level further comprises:

a floating-memory-utilization-assessment counter value less than or equal to a minimum-memory-utilization threshold count.

18. The system of claim 14, wherein said circuitry for maintaining at least one counter associated with at least one predefined memory utilization level, wherein the predefined memory utilization level is selected from the group including but not limited to a maximum-range memory utilization level, a medium-range memory utilization level, and a minimum-range memory utilization level further comprises:

circuitry for incrementing a floating-memory-utilization-assessment counter by at least two when both a main data processor and a main graphics processor are in active states;

circuitry for incrementing a floating-memory-utilization-assessment counter by at least one when either but not both the main data processor and the main graphics processor are in an active state; or circuitry for decrementing a floating-memory-utilization-assessment counter by at least one when neither the main data processor nor the main graphics processor is in an active state.

* * * * *